(12) United States Patent
Pete

(10) Patent No.: US 12,611,901 B1
(45) Date of Patent: Apr. 28, 2026

(54) FLYING AUTOMOBILE WITH INLINE TILTABLE DUAL ROTORS

(71) Applicant: William Garrett Pete, Lakeville, MN (US)

(72) Inventor: William Garrett Pete, Lakeville, MN (US)

( * ) Notice: Subject to any disclaimer, the term of this patent is extended or adjusted under 35 U.S.C. 154(b) by 3 days.

(21) Appl. No.: 19/199,733

(22) Filed: May 6, 2025

Related U.S. Application Data

(60) Provisional application No. 63/643,060, filed on May 6, 2024.

(51) Int. Cl.
| | |
|---|---|
| *B60F 5/02* | (2006.01) |
| *B64C 27/20* | (2023.01) |
| *B64C 27/52* | (2006.01) |
| *B64C 37/00* | (2006.01) |

(52) U.S. Cl.
CPC .............. *B60F 5/02* (2013.01); *B64C 27/20* (2013.01); *B64C 27/52* (2013.01); *B64C 37/00* (2013.01)

(58) Field of Classification Search
CPC ........... B60F 5/02; B64C 27/52; B64C 37/00
See application file for complete search history.

(56) References Cited

U.S. PATENT DOCUMENTS

| | | | |
|---|---|---|---|
| 6,745,977 | B1 * | 6/2004 | Long ...................... B64C 27/56 |
| | | | 244/221 |
| 7,188,803 | B2 * | 3/2007 | Ishiba ................. B64C 29/0025 |
| | | | 244/55 |
| D951,137 | S * | 5/2022 | Zhou ............................... D12/4 |
| 2025/0172947 | A1 * | 5/2025 | Xiong .................... B64C 27/52 |

FOREIGN PATENT DOCUMENTS

CN 119284156 A * 1/2025 ............. B64C 27/52

* cited by examiner

*Primary Examiner* — Joshua J Michener
*Assistant Examiner* — Cindi M Curry
(74) *Attorney, Agent, or Firm* — Thomas E. Loop

(57) ABSTRACT

A drivable and flyable automobile has a vehicle body with a symmetric design about its longitudinal axis, featuring a front end, rear end, and passenger compartment, as well as a plurality of wheels for driving and front and rear rotors for flying. The front and rear rotors are each connected to the body and are capable of tilting about respective colinear axes. The wheels and rotors are powered by an electric motor connected to a battery. A transmission system transmits power to either the wheels or the rotors, depending on whether the vehicle is being driven or flown, allowing the vehicle to switch between driving and flight modes.

3 Claims, 4 Drawing Sheets

FLYING AUTOMOBILE WITH INLINE TILTABLE DUAL ROTORS

CROSS-REFERENCE TO RELATED APPLICATIONS

This application claims the benefit of priority to U.S. Provisional Application No. 63/643,060 filed on May 6, 2024, which application is incorporated herein by reference in its entirety.

This disclosure relates to a dual rotor flying automobile, and more particularly, to a vehicle capable of both driving on the ground and flying through the air.

BACKGROUND OF THE INVENTION

The concept of a flying car has been a long-standing dream in the field of transportation. The idea of a vehicle that can seamlessly transition from road to air travel has been explored in various forms, from science fiction to real-world prototypes. However, the practical implementation of such a concept has been fraught with challenges. These challenges primarily revolve around the need to balance the requirements of road and air travel, which often have conflicting design and operational needs. For instance, a vehicle designed for road travel needs to be compact, efficient, and capable of navigating in tight spaces, while an aircraft needs to be lightweight, aerodynamic, and capable of generating enough lift to become airborne. Additionally, the safety and regulatory requirements for road and air travel are vastly different, adding another layer of complexity to the design of a flying car. Despite these challenges, the potential benefits of a successful flying car design are immense, ranging from reduced traffic congestion to increased mobility and convenience. Therefore, there continues to be a strong interest in developing a practical and viable flying car design. The present invention fulfills these needs and provides for further related advantages.

BRIEF SUMMARY OF THE INVENTION

In brief, the present invention is directed to a dual rotor vehicle that is capable of both driving on the ground and flying through the air. The vehicle body includes a front end, a rear end, and a passenger compartment located between these ends. The vehicle body is generally symmetrically aligned along a central longitudinal axis. A set of wheels are positioned around the vehicle body, allowing the vehicle to roll on the ground when driven. A front rotor is attached to the front end of the vehicle body, aligned with the longitudinal axis, and is horizontally positioned relative to the ground. This front rotor is located above the vehicle's center of mass and is tiltable around a front pivot axis that is colinear to the longitudinal axis. Similarly, a rear rotor is connected to the rear end of the vehicle body, also aligned with the longitudinal axis, and is horizontally positioned relative to the ground. The rear rotor is also above the center of mass and is tiltable around a rear pivot axis that is colinear to the longitudinal axis. The vehicle includes a power system attached to the body, which includes an electric motor connected to a battery. A transmission system is engageable with the motor and connected to both the wheels and the rotors. This transmission system can selectively and controllably transmit power to the wheels when the vehicle is driven and to the rotors when the vehicle is flown.

These and other aspects of the present invention will become more evident upon reference to the following detailed description and accompanying drawings. It is to be understood, however, that various changes, alterations, and substitutions may be made to the specific embodiments disclosed herein. The described and illustrated embodiments are to be considered as illustrative and not restrictive.

BRIEF DESCRIPTION OF THE SEVERAL VIEWS OF THE DRAWINGS

The drawings are intended to be illustrative of certain preferred embodiments of the present invention and as such they may not necessarily be drawn to scale. In addition, like reference numerals have been used to designate like parts and features throughout the several views of the drawings.

DETAILED DESCRIPTION OF THE INVENTION

Figure 1:
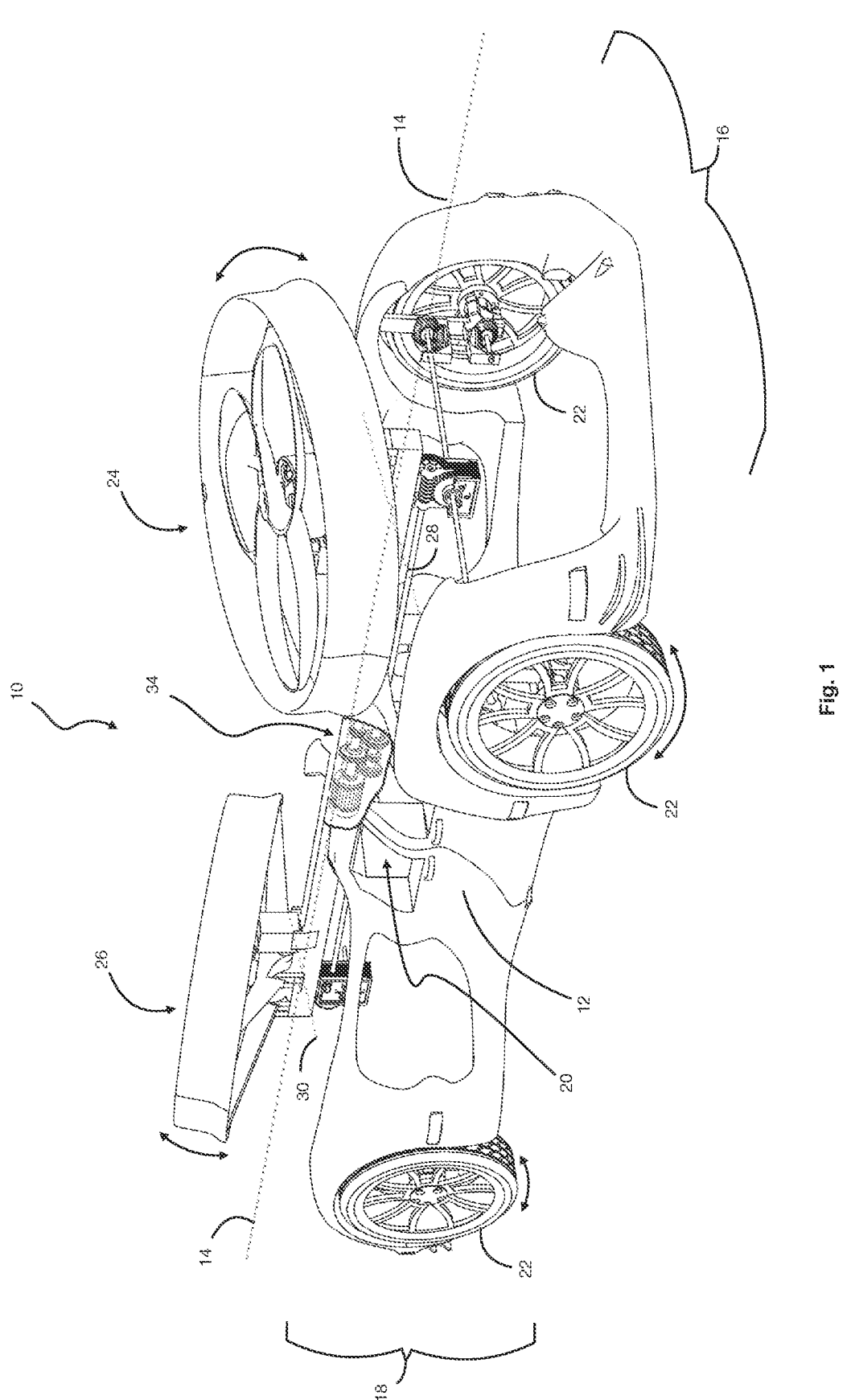
FIG. 1 illustrates an elevated frontside partial cutaway perspective view of a dual rotor drivable and flyable automobile in accordance with an embodiment of the present invention.
Figure 2:
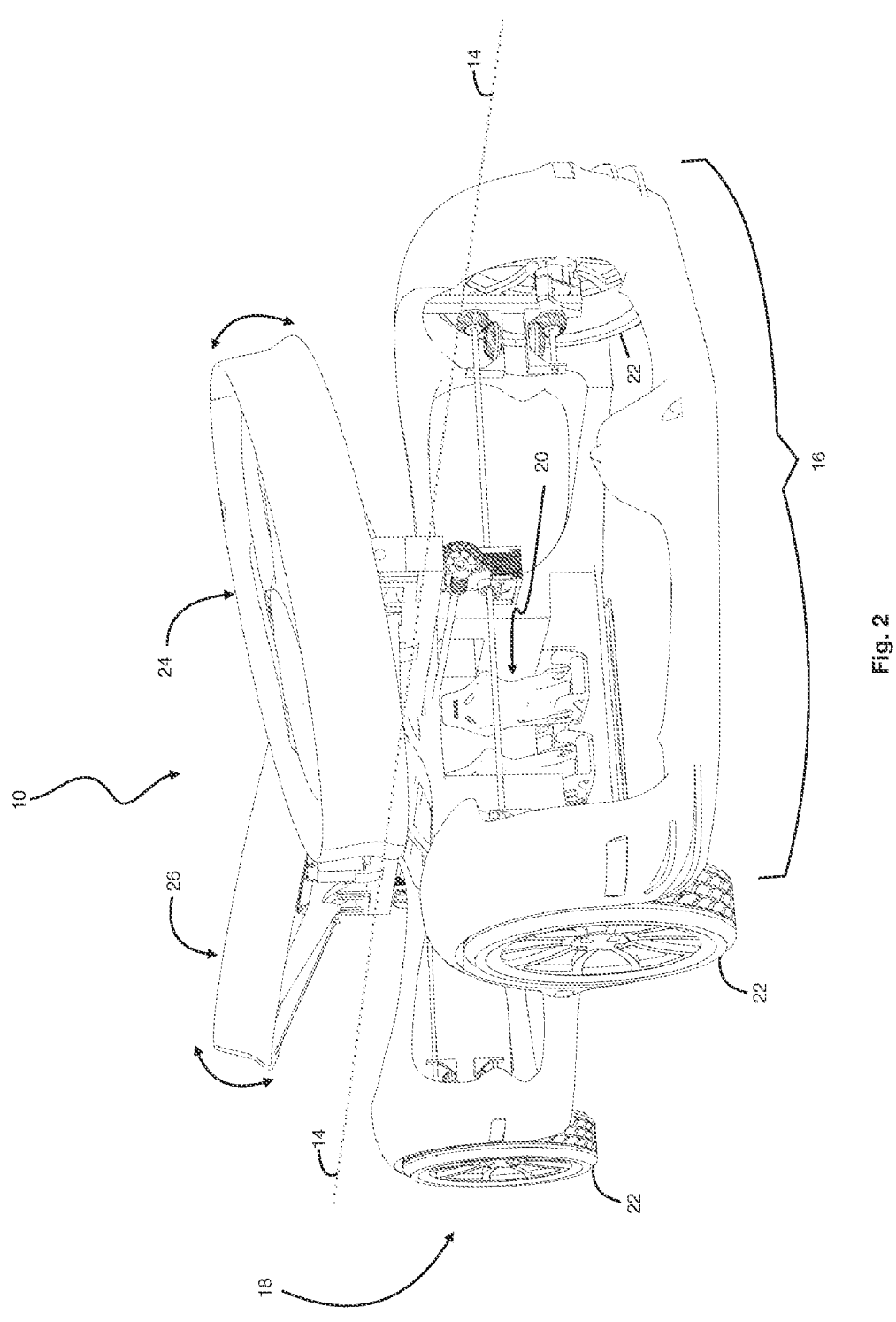
FIG. 2 illustrates a frontal partial cutaway perspective view of the dual rotor drivable and flyable automobile shown in FIG. 1.

The present invention may be understood more readily by reference to the following detailed description of certain preferred embodiments of the invention in view of the accompanying drawings. It is to be understood that the terminology used herein is for the purpose of describing specific embodiments only and is not intended to be limiting. It is to be further understood that unless specifically defined herein, the terminology used herein is to be given its conventional meaning as understood in the relevant art. Any headings used within this document are only being utilized to expedite its review by the reader, and should not be construed as limiting the claimed invention in any manner.

The disclosure provides a dual rotor automobile 10 that may operate both on the ground and in the air. As shown in the drawings, the dual rotor automobile 10 comprises a vehicle body 12 symmetrically aligned along a longitudinal axis 14 (represented as a dashed line), featuring a front end 16, rear end 18, and a passenger compartment 20. A plurality of wheels 22 are positioned around the vehicle body 12, configured to roll along the ground, enabling ground travel (when in drive mode). The front and rear rotors 24, 26, connected to the respective ends of the vehicle body 16, 18, are preferably substantially horizontally positioned relative to the ground (as shown) and tiltable about pivot axes colinear to the longitudinal axis 14, providing lift and control for flying (when in fly mode).

Figure 3:
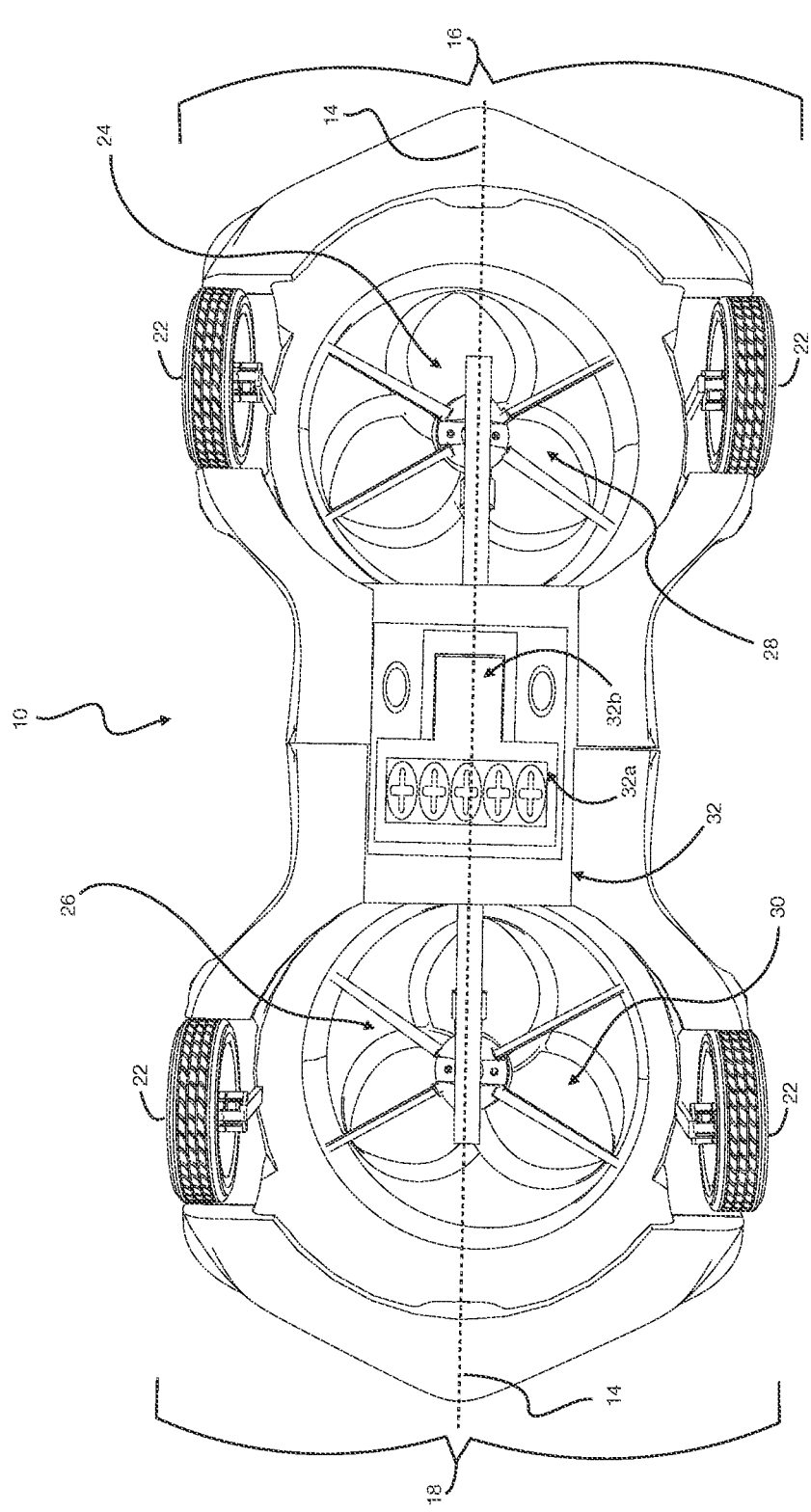
FIG. 3 illustrates a bottom plan view of the dual rotor drivable and flyable automobile shown in FIG. 1.
Figure 4:
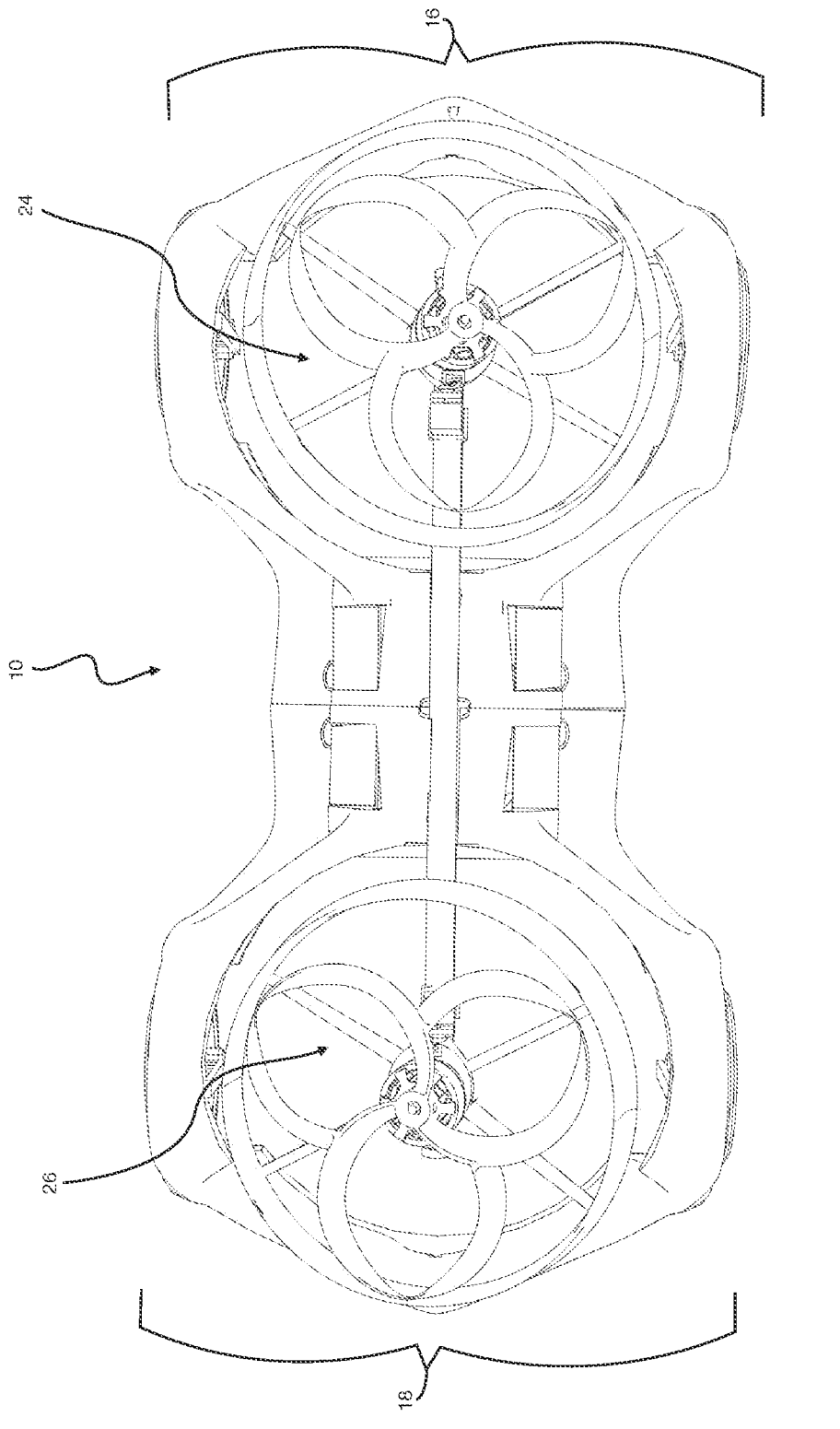
FIG. 4 illustrates a top plan view of the dual rotor drivable and flyable automobile shown in FIG. 1.

As best shown in FIG. 3, a power system 32, comprising an energy source 32a connected to a motor 32b, supplies power for operation. The energy source 32a may be a battery (as shown), and the motor 32b can be an electric motor (as shown), converting electrical energy to mechanical energy. A transmission system 34, engageable with the motor 32b, may selectively and controllably transmit power to the wheels 22 when driving- and to the rotors 16, 18, when flying, thus controlling power distribution. Additionally, a plurality of sensors (not shown) connected to a controller (not shown) may monitor selected physical conditions, while the controller can manage vehicle dynamics by controlling the speed and tilt of the rotors 16, 18, and wheels 22. This design aims to balance the requirements of road and air travel.

Referring specifically to FIGS. 1-4, the technical drawings illustrate an exemplary dual rotor drivable and flyable automobile 10 of a preferred embodiment, showcasing its design and components. The vehicle body 12 is symmetrically designed about its longitudinal axis 14 (shown as a dashed line), ensuring balance and stability during both driving and flying operations. As shown, the front rotor 24 and rear rotor 26 are strategically positioned inline with this axis 14, allowing for efficient lift and propulsion when the vehicle transitions to flight mode. These rotors 24, 26 are substantially horizontally aligned relative to the ground and are positioned above the center of mass, which may enhance the vehicle's aerodynamic performance and stability in the air. Each rotor is capable of tilting about a pivot axis that is colinear to the longitudinal axis 14, providing the necessary control for maneuvering during flight.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A drivable and flyable automobile having a center of mass and a longitudinal axis, comprising:

a vehicle body having a front end, a rear end, and a passenger compartment between the front end and the rear end, wherein the vehicle body is symmetrically positioned about the longitudinal axis;

a plurality of wheels positioned about the vehicle body and configured to roll along the ground when the automobile is being driven;

a front rotor connected to the front end of the vehicle body and inline with the longitudinal axis, wherein the front rotor is (i) horizontally positioned relative to the ground, (ii) positioned above the center of mass, and (iii) tiltable about a front pivot axis that is colinear to the longitudinal axis;

a rear rotor connected to the rear end of the vehicle body and inline with the longitudinal axis, wherein the rear rotor is (i) horizontally positioned relative to the ground, (ii) positioned above the center of mass, and (iii) tiltable about a rear pivot axis that is colinear to the longitudinal axis;

a power system attached to the vehicle body, wherein the power system comprises an energy source connected to a motor; and a transmission system engageable connected to the motor and to (i) the plurality of wheels, and (ii) the forward and rear rotors, wherein the transmission system is configured to selectively and controllably transmit power to the plurality of wheels when the vehicle is being driven and to the front and rear rotors when the vehicle is being flown.

2. The drivable and flyable vehicle of claim 1 wherein the energy source is a battery and the motor is an electric motor.

3. The drivable and flyable vehicle of claim 2, further comprising a plurality of sensors connected to a controller, wherein the plurality of sensors is configured to detect selected physical conditions, and wherein the controller is configured to control the speed and tilt of (i) the front and rears rotors, and (ii) the plurality of wheels.

* * * * *